Nov. 15, 1966  G. S. HILL ETAL  3,286,004
METHOD OF MANUFACTURING A FOAM PLASTIC ARTICLE
Filed April 30, 1964

INVENTORS
GEORGE S. HILL,
KENNETH R. DAVIS,
BY ROBERT O. SHUCK &
KEVORK A. TOROSSIAN

THEIR ATTORNEY

United States Patent Office 3,286,004
Patented Nov. 15, 1966

3,286,004
METHOD OF MANUFACTURING A FOAM PLASTIC ARTICLE
George S. Hill and Kenneth R. Davis, Anchorage, and Robert O. Shuck and Kevork A. Torossian, Louisville, Ky., assignors to General Electric Company, a corporation of New York
Filed Apr. 30, 1964, Ser. No. 363,841
3 Claims. (Cl. 264—45)

The present invention relates to a method of molding plastic articles comprising a fiber-reinforced plastic shell or skin and a resin foam core.

In one known method of manufacturing plastic articles such as boats, refrigerator cabinets and the like comprising a foam resin core and an outer shell or skin enclosing the core, there is employed a plurality of mold elements or members which cooperate to define a mold cavity having the size and configuration of the desired article. The liner or cavity forming surfaces of the mold members are sprayed or otherwise coated with a coating including a resin and a fibrous material such as glass fiber for reinforcing or mechanically strengthening the shell. The mold is then closed and a foam forming or foamable resin is introduced into the mold cavity and allowed to foam and cure to form the core.

In one method, the fibrous material, either along with the resin or after application of a resin layer, is sprayed onto the mold to form a fluffy, low density mat containing sufficient resin to act as a binder. In order to obtain the maximum strength in the shell, the mat of the fiber-reinforcing layer is compacted prior to the foaming operation. This has usually been accomplished by pressing the fibrous mat by means of a hand roller or equivalent pressing means in order to provide a compact, void-free fiber layer in which all of the fibers can be intimately bonded together during curing of the resin component of the shell.

This is a time consuming and laborious operation particularly in the manufacture of relatively large articles or articles of irregular configuration such as a refrigerator door, the inner panel of which usually comprises flange portions defining a storage shelf recess. To eliminate this step, it has been proposed to employ the pressure generated during foaming of the resin forming the core material to compact the fiber mat during the foaming operation. As the foamable resin, while in the fluid or viscous state easily penetrates the spaces between the fibers, a preformed barrier layer has been laid over the uncompacted mat to prevent such penetration. Various barrier materials have been proposed or used for this purpose including both plastic and metal films or sheets.

While the use of a preformed barrier and pressure transmitting film or sheet has been of some value in the manufacture of relatively flat articles, it has not been satisfactory for the molding of articles having irregular surface configurations such as the refrigerator door and the like. Unless the sheet material is carefully conformed to the exact configuration of the mold, or more specifically the mat surface, a uniform compression of the fibrous mat has not been obtained as any portions of the sheet bridging any cavity or depression either prevented the foam from compacting the fiber mat in these areas or ruptured so that the foam penetrated the uncompacted mat area. On the other hand, when the pressure transmitting film has been carefully shaped to the exact mold configuration, the operation has been as time consuming and costly as the previously used means for compressing the fibrous layer to a void-free structure.

The present invention has as an object thereof the provision of an improved method of manufacturing an article of the aforementioned type including improved means for employing the foam pressures for compacting the fiber componet of the shell.

Another object of the invention is to provide means for employing the foam pressure to compact the fiber layer which assures a uniform pressure on the fiber layer regardless of the shape or configuration of the mold surface.

Further objects and advantages of the invention will become apparent as the following description proceeds and the features of novelty which characterize the invention will be pointed out with particularity in the claims annexed to and forming part of this specification.

In carrying out the objects of the present invention in the manufacture of an article comprising a fiber-reinforced plastic shell and a resin foam core, the surface of a mold cavity is provided with a coating comprising a mat of fibrous material and a thermosetting resin binder by spraying onto the mold surface, either simultaneously or alternatively, the thermosetting resin and the reinforcing fibers. Before the resin binder has set or cured, there is applied to the exposed surface of the fibrous mat a sprayed-on coating of a webbing lacquer in an amount sufficient to form a flexible and thin but continuous film which covers the surface of, but does not substantially penetrate the mat. Thereafter, and also prior to curing of the binder in the fiber mat, the mold is closed and a foamable resin mixture is introduced into the mold cavity. The pressures exerted on the webbing lacquer film during foaming of the resin core are uniformly transmitted by the film to the mat to compact the mat during the expansion of the foamable resin.

The term "webbing lacquer" as used herein and in the appended claims refers to a resin solution or suspension which, when sprayed onto the surface of the fiber mat layer, will not substantially penetrate that layer but instead will form a flexible webbing or film on, and conforming to, the surface of the fiber layer. Such lacquers are characterized by the presence of a highly volatile solvent most or all of which evaporates before the atomized lacquer reaches the mat surface. Spray actually reaching the mat surface is in the form of tacky or sticky solid, rather than liquid, particles which do not penetrate the mat but instead adhere to the individual fibers forming the surface of the mat and to one another. The result is a bridging of the spaces between adjacent fibers, to form a continuous thin film which, to a substantial extent, follows even the minute surface irregularities of the mat.

For a better understanding of the invention reference may be had to the accompanying drawing in which.

While the invention is applicable to the molding of various plastic articles including a foamed resin core and a shell or outer skin of a plastic material, it will be described particularly with reference to the molding of an all-plastic refrigerator door including an outer panel forming the front surface of the door and an inner panel forming the inner surface of the door liner and including projecting flanges adapted to extend into a refrigerator storage compartment about the periphery of the compartment access opening.

Figure 1:
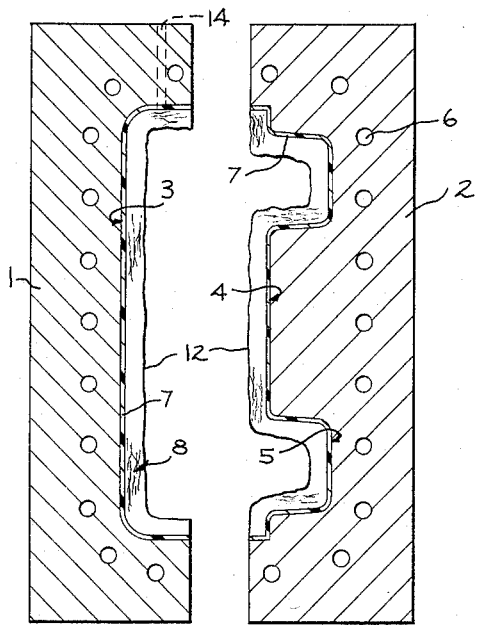
FIGURE 1 is a sectional view of two mold members with the shell forming materials applied thereto.
Figure 3:
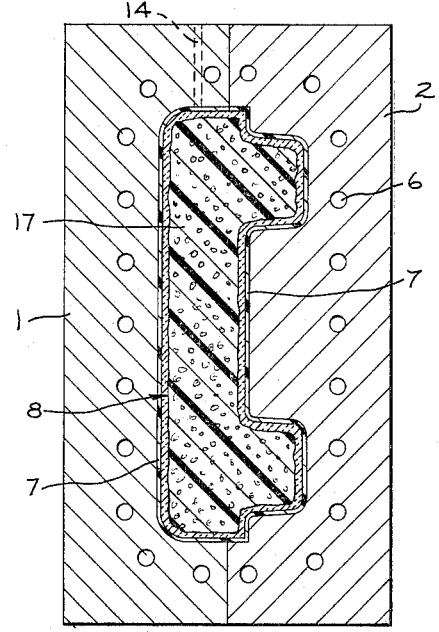
FIGURE 3 is a sectional view illustrating the two mold members in a closed position and the product in the finished, molded state.
Figure 2:
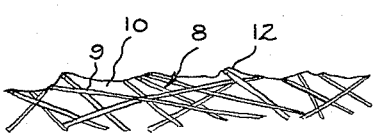
FIGURE 2 is an enlarged sectional view of a portion of the shell forming materials of FIGURE 1 prior to introduction of the foam forming resin and illustrating the manner in which the webbing lacquer film overlies the fiber mat component of the shell material.

With particular reference to FIGURES 1, 2 and 3 of the drawing, there is illustrated a mold comprising a first mold member 1 and a second mold member 2 adapted to cooperate to form a mold cavity shaped to provide an all-plastic refrigerator door. The mold member 1 includes a liner or mold cavity surface 3 shaped to form the front of the door while the mold member 2 includes surface 4 providing the shape of the inner panel of the door. The surface 4 includes recesses 5 for forming projections adapted to extend into the refrigerator storage compartment as previously described. Each of the mold sections also includes passages 6 for introducing a heating or cooling fluid into the mold sections for maintaining the mold members at their desired operating temperatures during the molding cycle.

The materials forming the shell or skin of the final product are preferably sprayed onto the molding surfaces 3 and 4 of the two mold members 1 and 2 employing any suitable equipment.

While various melamine, phenolic and similar resins may be used, the preferred resin component of the shell is an unsaturated polyester resin with thermosetting properties. Polyester resins provide a fast molding cycle and are capable of curing without the formation of gaseous byproducts. They also provide good surface appearance, abrasion resistance and can be modified either chemically or with additives to provide flame retarding properties.

As the fiber reinforcing component of the shell there may be employed any suitable fibrous material such as asbestos fibers, cotton fibers or the like. A preferred reinforcing fiber is a chopped glass fiber. The fiber can be applied along with the resin component or it may be applied after a resin layer has been applied to the mold surface and while the resin layer is still in the uncured, tacky state.

In a preferred method of practicing the present invention, there is first sprayed onto the cavity surface a coating 7 comprising a polyester resin, a suitable catalyst and a pigment in sufficient quantities so that the mixture is thixotropic and will readily remain in place after application to the mold surfaces. After this coating has cured or partially cured, there is applied a second sprayed-on layer or mat 8 of fibers, preferably glass fibers, and a binder comprising a polyester resin for compatibility and adhesion to the initially applied coating.

Regardless of whether the mat of fibrous material and the resin binder is applied as the sole coating directly to the mold surface or as a second coating, the mat 8, as illustrated in FIGURE 3 of the drawing, comprises a multitude of randomly oriented fibers 9 in a somewhat fluffy or uncompacted arrangement. While these fibers are coated with or partly embedded in the binder component, the mat nevertheless contains a multitude of interstices or air pockets 10 which must be removed for maximum shell strength.

In the next step there is applied to the surface of the mat 8, a pressure transfer film 12 by spraying onto the mat a webbing lacquer having the properties heretofore enumerated. The webbing lacquer is applied to the entire exposed surface of the mat 8 in an amount sufficient to form on the surface of the mat a relatively thin but continuous web or film. This film, which may be relatively thin, as for example .001 inch in thickness, comprises the tacky particles of resin bonded to the surface fibers of the mat 8 and to one another.

Any suitable webbing lacquer may be employed depending upon the film characteristics desired. When only a moderate elastic film is needed during the foaming operation, a solution of cellulose nitrate and a plasticizer in a volatile solvent can be employed. However, when a maximum stretch or elongation of the film 12 is required, as for example when the mold surfaces are irregular or in other words contain recesses of substantial depth so that portions of the film may need to stretch or elongate during the foaming operation, there is preferably employed a webbing lacquer comprising a 20 to 40 percent solution of plasticized vinyl chloride-acetate resins or hydroxy-vinyl chloride acetate resins in a relatively volatile solvent component. A suitable webbing lacquer comprises about 25 percent by weight of a vinyl chloride-vinyl acetate copolymer resin, about 4 percent by weight of an epoxidized soybean oil plasticizer, remainder essentially a solvent mixture comprising a major portion of methyl ethyl ketone and a small amount of methyl isobutyl ketone. A lacquer of this type if furnished by Protective Treatments, Inc. and is identified as Webbing Lacquer XC–13–103B.

The webbing lacquer film is applied to all of the surface areas of the mat while the binder component of the mat 8 is still in a plastic or uncured state.

As soon as the film 12 has been applied, the two mold sections are brought into cooperating relationship and a foamable resin mixture introduced through one or more passages 14 provided in one or both of the mold members 1 and 2. As the foamable resin, and particularly when the final article is intended to have heat insulating properties, there is employed a polyurethane resin including a halogenated alkane such as R11 as a foaming agent. As is well known, rigid, cellular or foamed polyurethane resins may be made from either liquid polyether or polyester polyurethane reaction mixtures. The polyester polyurethane resins, for example, are made by reacting a slightly branched polyester with a di-isocyanate or by reacting a linear polyester with a mixture of di- and tri-isocyanates to form cross linked rigid or solid resinous products. The R11 or similar halogenated alkane is dispersed or dissolved in one or both of the reactants so that the vaporization thereof by the heat of the resin foaming reaction will provide the desired foam structure having good heat insulating properties.

The exothermic reaction of the resin mixture causes the resin mass to expand and to completely fill the mold cavity. The smooth surface provided by the film 12 facilitates this expansion since its relatively smooth surface provides minimum friction opposing the foam rise within the mold cavity. Also the continuous film 12 completely separates the foaming resin from the mat during the foaming operation so that there is no penetration of the foam into the glass fiber mat. Concurrently the film 12, being elastic and flexible, stretches and completely conforms to the irregular surfaces of the fiber mat during the compacting of that mat by the pressures of the foam being generated in the cavity. These pressures serve to compact the mat during the foaming operation and at the same time the heat of the reaction assists in the curing of the binder component of the mat. Since the polyurethane resin is capable of bonding closely to the webbing film which in turn is bonded to the mat, a good adhesion of the shell to the foam core is obtained.

After the foam core 17 has completely cured, the mold is cooled and the molded article removed therefrom.

Figure 4:
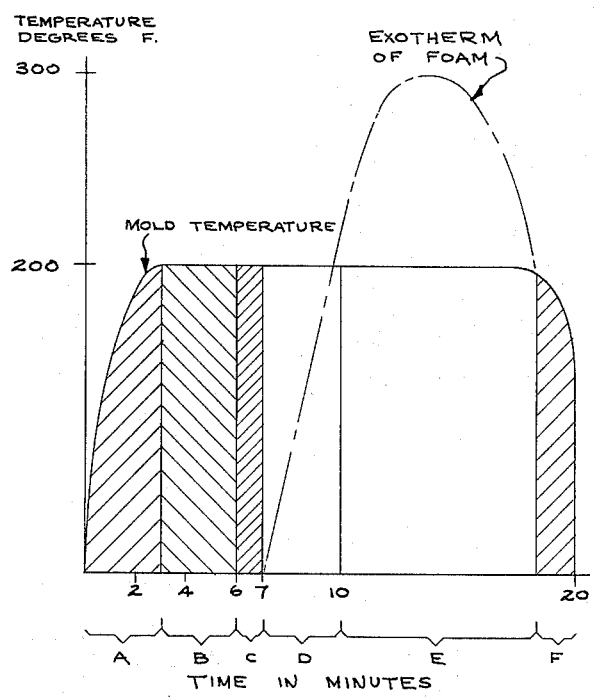
FIGURE 4 is a time temperature chart illustrating the various steps of the preferred method of the present invention.

The following is an example of the practice of the method of the present invention in accordance with what is presently considered to be a preferred form thereof, reference being made to FIGURE 4 in connection therewith. In the first step A, there was applied to the liner surfaces of the mold members a surface coating commonly called a gel coat and comprising an unsaturated polyester resin, a finely divided silica thixotropic pigment agent and methyl ethyl ketone peroxide as a catalyst. The mold was heated to 200° F. over a period of about 3 minutes to substantially cure the portion of the coating in contact with the mold surface but to leave the surface exposed to the air in a tacky condition. In the next step B of about 4 minutes duration, chopped glass fibers and an unsaturated polyester resin binder containing a smaller amount of the methyl ethyl ketone peroxide catalyst than the surface coating were simultaneously applied to the mold surface in the ratio of about 28 parts glass fiber to 72 parts binder to form a mat of fibers on the first layer or coating. The mold during this and subsequent steps of the method was held at a temperature of 200° F.

During the next step C of about 1 minute duration, there was applied to the surface of the glass fiber mat, a thin layer of webbing lacquer comprising the above-mentioned polyvinyl chloride-acetate lacquer solution. The mold was immediately closed and a foamable polyurethere was applied to the surface of the glass fiber mat, a duced into the closed mold. The mold temperature was maintained at about 200° F. although the exothermic reaction of the polyurethane resin raised the temperature of the foaming resin to approximately 300° F. during the foaming step. After a total of 18 minutes the foam had expanded to compress the fiber mat and had cured to a solid rigid state. The polyester resin components of the surface and fiber mat layers also cured during the foaming operation and this cure was accelerated by the heat generated by the polyurethane reaction. The mold was then cooled by passing cold water through the passages 6 and the finished molded product was extracted from the mold.

From the above schedule, it will be obvious that the barrier or pressure producing film of webbing lacquer can be applied to the mat surfaces in a much shorter time than that required to either compact the glass fiber mat by hand or to apply to the entire surface of the mat a preformed film or sheet.

While there has been shown and described a particular embodiment of the present invention it is to be understood that the invention is not limited thereto and is intended by the appended claims to cover all such modifications as fall within the true spirit and scope of the invention.

What we claim as new and desire to secure by Letters Patent of the United States is:

1. The method of manufacturing an article comprising a fiber-reinforced plastic shell and a resin foam core, which method comprises:
    applying to a mold surface adapted to form a mold cavity with a sprayed-on coating comprising reinforcing fibers and a thermosetting resin binder to form an uncompacted mat of fibers and binder,
    prior to curing of said binder, spraying onto the exposed surface of said mat a flexible film of webbing lacquer,
    bringing said mold members together to form a closed mold cavity,
    introducing into said cavity a foam forming resin mixture adapted during expansion thereof to form a resin foam core to exert a pressure on said film thereby compacting said mat,
    said film preventing penetration of said foamable resin into said mat during foaming thereof,
    and finally removing the article so formed from the mold cavity.

2. The method of manufacturing an article comprising a fiber-reinforced plastic shell and a resin foam core, which method comprises:
    coating the mold surface of at least one of a plurality of cooperating members adapted to form a mold cavity with a layer of a thermosetting resin and partially curing said layer,
    spraying onto said partially cured layer, a mixture of reinforcing fibers and a thermosetting resin binder to form an uncompacted mat of fibers and binder,
    prior to curing of said binder, spraying onto the exposed surface of said mat a film of webbing lacquer to form on said mat a continuous flexible plastic film which covers the surface of, but does not penetrate, said mat,
    closing said mold and introducing into the mold cavity, a foamable resin in an amount sufficient to form a rigid resin foam filling said cavity and to exert a pressure on said film for compacting said mat during expansion of said foamable resin,
    said film preventing penetration of said foamable resin into said mat,
    and finally removing the article so formed from the mold cavity.

3. The method of manufacturing an article comprising a fiber-reinforced plastic shell and a resin foam core, which method comprises:
    coating the mold surface of at least one of a plurality of cooperating members adapted to form a mold cavity with a coating of a polyester resin and a pigment and partially curing said coating,
    spraying onto said partially cured coating a mixture of chopped glass fibers and a polyester resin binder to form an uncompacted mat of fibers and binder,
    prior to curing of said binder, spraying onto the exposed surface of said mat a polyvinyl chloride-acetate webbing lacquer to form on said mat a continuous flexible plastic film which covers the surface of, but does not penetrate, said mat,
    bringing said mold members together to form a closed mold cavity, introducing into said cavity a foamable polyurethane resin adapted to form a rigid resin foam filling said cavity and to exert a pressure on said film thereby compacting said mat during expansion of said foamable resin,
    said film preventing penetration of said polyurethane resin into said mat,
    and finally removing the article so formed from the mold cavity.

References Cited by the Examiner

UNITED STATES PATENTS

| 1,608,727 | 11/1926 | Dickey | 264—45 XR |
| 2,802,766 | 8/1957 | Leverenz | 264—45 |

FOREIGN PATENTS 213,094　2/1958　Australia.

ROBERT F. WHITE, *Primary Examiner.*

P. E. ANDERSON, *Assistant Examiner.*